United States Patent
Chen

(10) Patent No.: US 9,606,597 B2
(45) Date of Patent: Mar. 28, 2017

(54) INTERMEDIATE ELECTRONIC DEVICE, METHOD FOR OPERATING THE INTERMEDIATE ELECTRONIC DEVICE AND ELECTRONIC SYSTEM

(71) Applicant: VIA TECHNOLOGIES, INC., New Taipei (TW)

(72) Inventor: Yi-Te Chen, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 175 days.

(21) Appl. No.: 14/205,790

(22) Filed: Mar. 12, 2014

(65) Prior Publication Data

US 2015/0160705 A1    Jun. 11, 2015

(30) Foreign Application Priority Data

Dec. 5, 2013 (TW) .............................. 102144544 A

(51) Int. Cl.
G06F 1/26      (2006.01)
H02J 1/00      (2006.01)
H02J 1/10      (2006.01)

(52) U.S. Cl.
CPC . *G06F 1/26* (2013.01); *H02J 1/10* (2013.01)

(58) Field of Classification Search
CPC ...................................... G06F 1/26; H02J 1/00
See application file for complete search history.

(56) References Cited

U.S. PATENT DOCUMENTS

| | | | |
|---|---|---|---|
| 8,344,874 B2 | 1/2013 | Fadell | |
| 8,775,846 B2* | 7/2014 | Robinson | G06F 1/263 |
| | | | 323/318 |
| 9,372,529 B1* | 6/2016 | Klein | G06F 1/3287 |
| 2004/0054836 A1 | 3/2004 | Lai et al. | |

(Continued)

FOREIGN PATENT DOCUMENTS

| | | |
|---|---|---|
| CN | 101499311 | 8/2009 |
| CN | 102138134 | 7/2011 |

(Continued)

OTHER PUBLICATIONS

Chinese language office action dated Apr. 21, 2016, issued in application No. CN 201410027387.X.

*Primary Examiner* — Thomas Lee
*Assistant Examiner* — Chad Erdman
(74) *Attorney, Agent, or Firm* — McClure, Qualey & Rodack, LLP

(57) ABSTRACT

An intermediate electronic device, arranged to be coupled to a host system and an electronic device. The intermediate electronic device includes: a controller, enabled by an enable signal to process the data transmission between the host system and the electronic device; and a power transmission unit disposed between the host system and the electronic device. The power transmission units detect whether the power transmission unit is coupled to the host system or an external power source. When the power transmission unit detects that the power transmission unit is coupled to the host system, but not coupled to the external power source, the power transmission unit informs the host system to raise the voltage output to the intermediate electronic device to supply power to the electronic device, and outputs the enable signal.

16 Claims, 14 Drawing Sheets

(56) References Cited

U.S. PATENT DOCUMENTS

| | | | |
|---|---|---|---|
| 2008/0054855 A1* | 3/2008 | Hussain | H02J 7/0057 320/162 |
| 2008/0162955 A1* | 7/2008 | Shimizu | G06F 1/266 713/300 |
| 2008/0278002 A1* | 11/2008 | Platania | H02J 7/0065 307/49 |
| 2008/0288703 A1 | 11/2008 | Iyer | |
| 2011/0181432 A1 | 7/2011 | Ou et al. | |
| 2012/0005496 A1* | 1/2012 | Baker | G06F 1/266 713/300 |
| 2012/0030454 A1* | 2/2012 | Book | G06F 9/4401 713/2 |
| 2012/0300516 A1 | 11/2012 | Chen et al. | |
| 2013/0132614 A1* | 5/2013 | Bajpai | G06F 3/00 710/10 |
| 2013/0169053 A1* | 7/2013 | Lin | H02J 4/00 307/80 |
| 2013/0234668 A1* | 9/2013 | Kuo | H02J 7/0052 320/125 |
| 2014/0059361 A1* | 2/2014 | Tajima | G06F 1/266 713/300 |

FOREIGN PATENT DOCUMENTS

| | | |
|---|---|---|
| JP | 2010-39975 | 2/2010 |
| TW | 201126332 | 8/2011 |
| TW | 201327126 | 7/2013 |
| TW | M464710 | 11/2013 |

\* cited by examiner

INTERMEDIATE ELECTRONIC DEVICE, METHOD FOR OPERATING THE INTERMEDIATE ELECTRONIC DEVICE AND ELECTRONIC SYSTEM

CROSS REFERENCE TO RELATED APPLICATIONS

This application claims priority of Taiwan Patent Application No. 102144544, filed on Dec. 5, 2013, the entirety of which is incorporated by reference herein.

BACKGROUND OF THE INVENTION

Field of the Invention

The present invention relates to an intermediate electronic device, and in particular to an intermediate electronic device that uses a power transmission unit.

Description of the Related Art

Typically, there are two types of electric power transmission regulations for Universal Serial Bus (USB): USB 2.0 and USB 3.0. Under the electric power transmission regulation of USB 2.0, the maximum current value is 500 mA and the maximum voltage value is 5 V, which are transmitted by USB power ($V_{Bus}$). The electric power transmission regulation of USB 2.0 allows a maximum power transmission of 2.5 Watt. Likewise, under the electric power transmission regulation of USB 3.0, the maximum current value is 900 mA and the maximum voltage value is 5 V, which are transmitted by USB power ($V_{Bus}$). The electric power transmission regulation of USB 3.0 allows a maximum power transmission of 4.5 Watt.

Recently, Universal Serial Bus (USB) is widely used, so a new USB Power Delivery specification is proposed. The new USB Power Delivery specification has a plurality of crucial features. Firstly, the maximum current value is increased to 5 A and the maximum voltage value is increased to 20 V, which are transmitted by USB power ($V_{Bus}$). That is to say, the new USB Power Delivery method allows a maximum power transmission of 100 Watt, so the charging time is drastically decreased. Secondly, under the conventional electric power transmission regulations, power supply is one-way (unidirectional). For example, the electric power is transmitted from the host system to the electronic device. However, the new USB Power Delivery specification defines a switchable electric power transmitting direction. For example, while the electronic device is able to receive electric power from the external power source, the electronic device is able to supply electric power of the external power source to the host system. Thirdly, electronic devices that have adopted the new USB Power Delivery specification are compatible with electronic devices that have adopted the conventional electric power transmission regulations (for example, electronic devices that have adopted USB 2.0 and USB 3.0).

The conventional chip controller of an electronic device has one pin, arranged to connect to a USB power line to detect whether the electronic device is connected to host system or not. When the USB power line is connected to the host system, the voltage of USB power acts as a detection signal (VBus_DET) and then is transmitted to the chip controller via the pin. When the chip controller detects that the electronic device is connected to the host system, the chip controller sequentially starts to work. In other word, the voltage of USB power can be regarded as an enable signal to enable the chip controller of the electronic device. The enable signal represents the detection signal of USB power herein and hereafter.

Under the conventional electric power transmission regulations, the voltage of USB power is only 5V, so the USB power can act as the enable signal directly and is directly transmitted to the chip controller of the electronic device without making the chip controller break down or burn out. However, under the new USB Power Delivery specification, the maximum voltage is 20 V, which is transmitted by USB power ($V_{Bus}$). The chip controller of the electronic device may be damaged or burn out when USB power with 20 V directly acts as the enable signal and is directly transmitted to the chip controller.

Therefore, there is a need to present a new electronic device, such that the new electronic device can work normally under the high voltage provided by USB power ($V_{Bus}$) without making the chip controller of the electronic device break down or burn out.

BRIEF SUMMARY OF THE INVENTION

A detailed description is given in the following embodiments with reference to the accompanying drawings.

In view of this, the present invention proposes an intermediate electronic device. The intermediate electronic device can work normally under the high voltage provided by USB power ($V_{Bus}$) without making the chip controller of the intermediate electronic device break down or burn out, and therefore charging time is decreased. Moreover, the intermediate electronic device can further switch direction of power transmission, such that the external power source, such as wall adaptor or DC Jack, can provide electric power to the host system via the intermediate electronic device.

The present invention proposes an intermediate electronic device, arranged to be coupled to a host system and an electronic device. The intermediate electronic device comprises a controller and a power transmission unit. The controller is enabled by an enable signal to process the data transmission between the host system and the electronic device. The power transmission unit is disposed between the host system and the electronic device to detect whether the power transmission unit is coupled to the host system or an external power source. When the power transmission unit detects that the power transmission unit is coupled to the host system, but not coupled to the external power source, the power transmission unit informs the host system to raise the voltage output to the intermediate electronic device to supply power to the electronic device, and outputs the enable signal.

The behavior of the above intermediate electronic device is a method for operating the intermediate electronic device, which is proposed by another embodiment of the present invention. The intermediate electronic device is arranged to be coupled to a host system and an electronic device. The method for operating the intermediate electronic device comprises detecting the connection status between the intermediate electronic device and the host system, and between the intermediate electronic device and an external power source; informing the host system to raise the voltage output to the intermediate electronic device to supply power to the electronic device when the intermediate electronic device is coupled to the host system, but not coupled to the external power source; and outputting an enable signal to enable a controller of the intermediate electronic device.

Another embodiment of the present invention further proposes an electronic system. The electronic system comprises a host system and an intermediate electronic device. The intermediate electronic device is arranged to couple the host system to an electronic device. The intermediate electronic device further comprises a controller and a power transmission unit. The controller is enabled by an enable signal to process the data transmission between the host system and the electronic device. The power transmission unit is disposed between the host system and the electronic device to detect whether the power transmission unit is coupled to the host system or an external power source; when the power transmission unit detects that the power transmission unit is coupled to the host system, but not coupled to the external power source, the power transmission unit informs the host system to raise the voltage output to the intermediate electronic device to supply power to the electronic device, and outputs the enable signal.

The chip controller of the aforementioned intermediate electronic device receives the enable signal transmitted by the power transmission unit, rather than directly receiving the high voltage of USB power. Therefore, this method can prevent the chip controller from burning out or breaking down. Moreover, the intermediate electronic device is further used to supply electric power from the external power source to the host system.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1B:
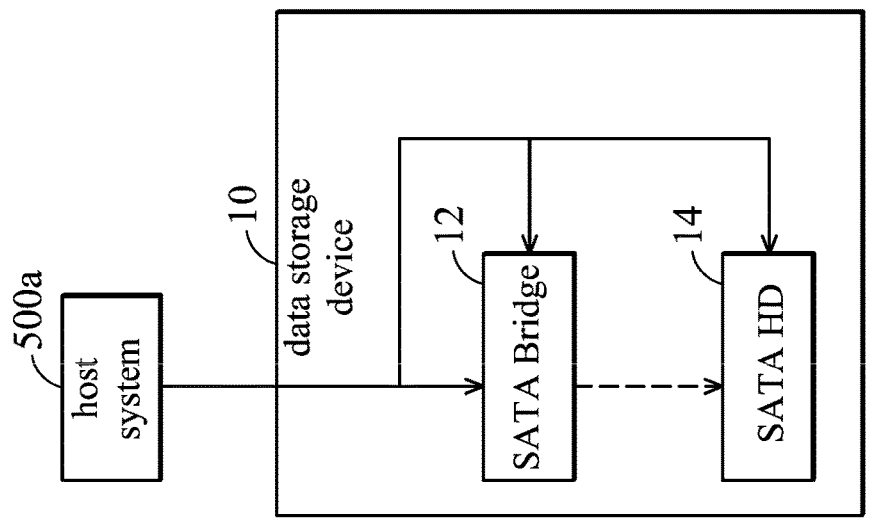
FIG. 1B is a diagram illustrating a conventional 2.5-inch SATA HD which receives the enable signal with the voltage level of 5V, under Bus-Power mode.

The following description is of a mode for carrying out the invention with the reference of figures. This description is made for the purpose of illustrating the general principles of the invention and should not be taken in a limiting sense. The scope of the invention is best determined by reference to the appended claims. Wherever possible, the same reference numbers are used in the drawings and the descriptions to refer to the same or like parts.

Data Storage Device

Figure 1A:
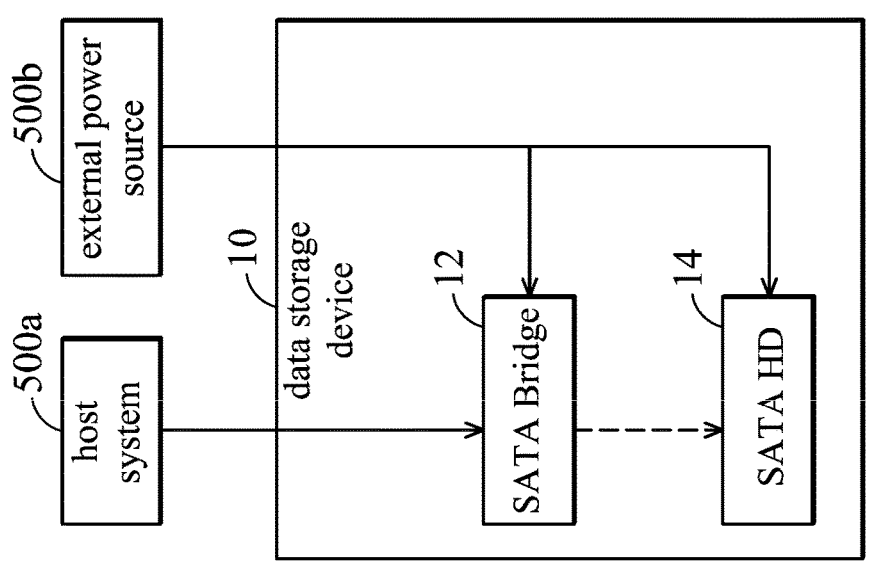
FIG. 1A is a diagram illustrating a conventional 2.5-inch SATA HD which receives the enable signal with the voltage level of 5V, under Self-Power mode.
Figure 1C:
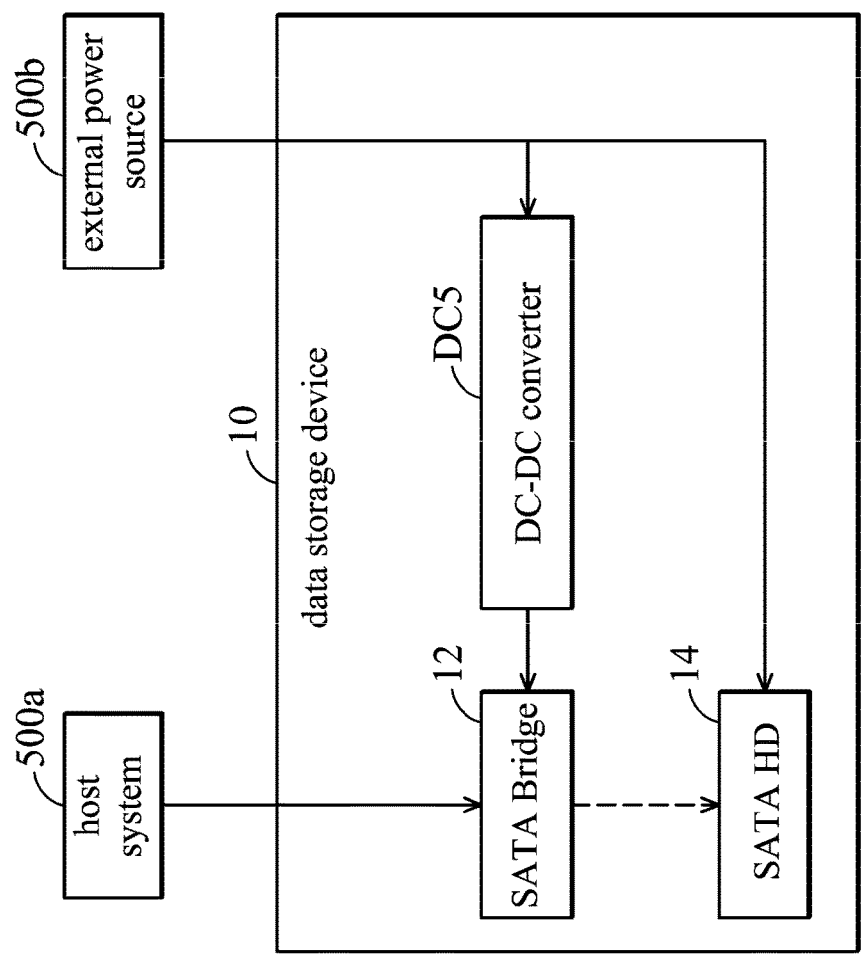
FIG. 1C is a diagram illustrating a conventional 3.5-inch SATA HD which receives the enable signal with the voltage level of 5V, under Self-Power mode.
Figure 2:
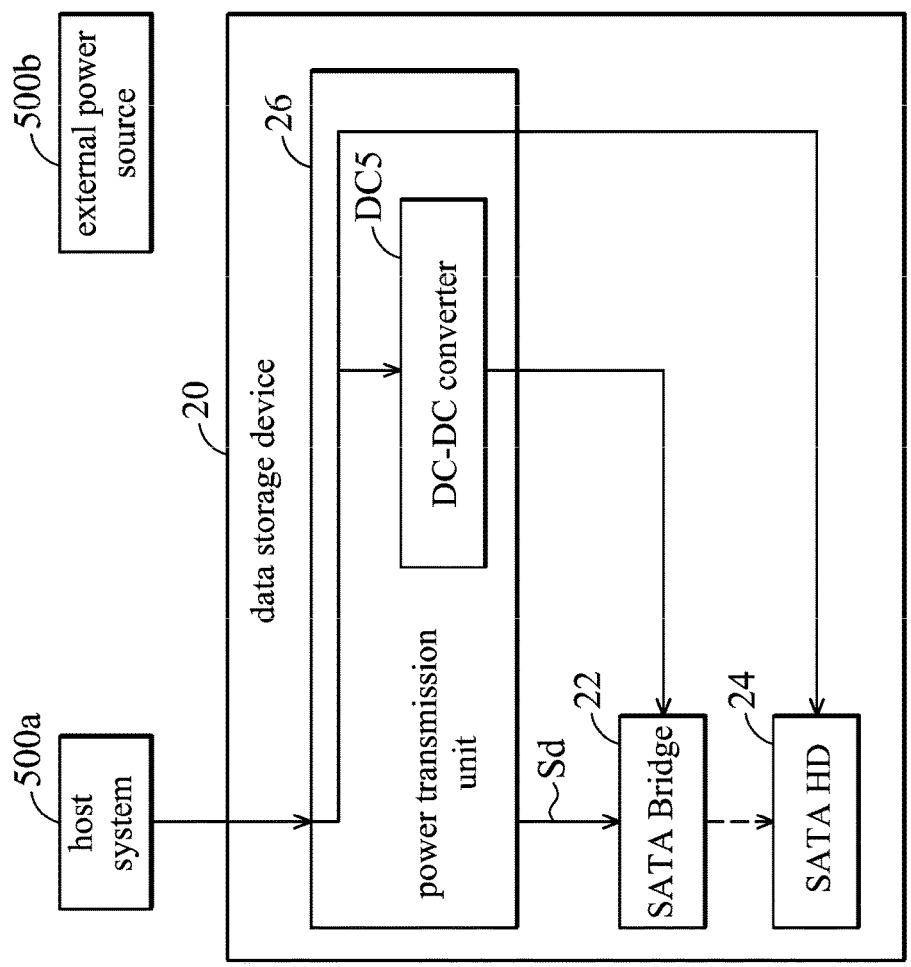
FIG. 2 is a diagram illustrating a 3.5-inch data storage device, according to an embodiment of the present invention.

By referring to FIGS. 1A, 1B and 1C, the limitations and the problems encountered by conventional data storage devices can be well understood. Then, FIG. 2 presents the disclosure of the present invention, and it can be realized how the present invention overcomes the problems encountered by the conventional data storage device.

FIGS. 1A-1C illustrate a conventional data storage device as described herein. Herein, the data storage device acts as SATA (Serial Advanced Technology Attachment) hard disk device. FIG. 1A is a diagram illustrating a conventional 2.5-inch SATA HD which receives the enable signal with a voltage level of 5 V, under Self-Power mode; FIG. 1B is a diagram illustrating a conventional 2.5-inch SATA HD which receives the enable signal with a voltage level of 5 V, under Bus-Power mode; FIG. 1C is a diagram illustrating a conventional 3.5-inch SATA HD which receives the enable signal with a voltage level of 5 V, under Self-Power mode. The Self-Power mode means that the data storage device 10 is powered by an external power source 500b; in contrast, Bus-Power mode means that the data storage device 10 is powered by the voltage of USB power of a host system 500a.

In FIG. 1A, the data storage device 10 may couple to the host system 500a and the external power source 500b via the USB interface (not shown) and power interface (not shown), respectively. The host system 500a may supply the enable signal with the voltage level of 5 V to the data storage device 10 via the Vbus pin of the aforementioned USB interface. The external power source 500b supplies the working voltage to a SATA Bridge 12 and a 2.5-inch SATA Hard Disk (SATA HD) 14 inside the data storage device 10. When the SATA Bridge 12 receives the enable signal from the host system 500a and the working voltage from the external power source 500b, accordingly determining that the data storage device 10 is connected to the host system 500a. Then, the SATA Bridge 12 performs protocol transmission between USB transmission protocol and SATA transmission protocol, such that the host system 500a may access data from the SATA HD 14. Under the conventional power transmission regulations, such as the power transmission regulation of USB 2.0 or USB 3.0, the voltage level on the Vbus pin of the USB interface is regulated at 5 V and the working voltage of the 2.5-inch SATA HD is commonly 5V. The aforementioned power interface can be a DC Jack or a wall adaptor, for example.

As seen in FIG. 1B, the difference from FIG. 1A is that the data storage device 10 of FIG. 1B can receive a voltage level of 5 V from the host system 500a under Self-Power mode, and takes the voltage level of 5 V as the enable signal and the working voltage of the data storage device 10. That is to say, the data storage device 10 only needs the voltage level of 5 V from the host system 500a to work, and it does not need the external power source 500b as shown in FIG. 1A. Being similar to the SATA Bridge 12 of FIG. 1A, when the SATA Bridge 12 of FIG. 1B receives the enable signal and the working voltage with 5V voltage level, accordingly determining that the data storage device 10 is connected to the host system 500a. Then, the SATA Bridge 12 performs protocol transmission between the USB transmission protocol and the SATA transmission protocol, such that the host system 500a may access data from a SATA HD 14.

FIG. 1C is a diagram illustrating another data storage device 10 which receives the enable signal with the voltage level of 5 V, under Self-Power mode. In FIG. 1C, the data storage device 10 takes the 3.5-inch SATA HD 14 as a storage medium. The working voltage of 3.5-inch SATA HD is commonly 12V, and the voltage level of USB power is regulated at 5 V. Therefore, the data storage device 10 which takes 3.5-inch SATA HD as a storage medium typically operated in Self-Power mode, as shown in FIG. 1C. The difference between FIG. 1C and FIG. 1A is that in FIG. 1C, a DC-DC converter DC5 is added to convert the voltage level of 12V supplied by the external power source 500b into the working voltage of the STAT Bridge 12, such as 5 V.

Under the new USB Power Delivery specification, the voltage level of USB power can be increased to voltages higher than 5 V, such as 12 V or 20 V. However, the SATA Bridge of the conventional data storage device cannot endure an enable signal with a voltage level higher than 5 V. Therefore, when the voltage level of USB power is increased to a voltage level higher than 5 V, the SATA Bridge 12 will burn out or break down. In view of this, there is a need to present a new data storage device which can work under the new USB Power Delivery specification.

FIG. 2 is a block diagram illustrating a data storage device 20 coupled to the host system 500a, according to an embodiment of the present invention. As shown in FIG. 2, the data storage device 20 comprises: a SATA Bridge 22, a SATA HD 24 and a power transmission unit 26. The interaction between the components of the data storage device 20 will be described in detail below.

The power transmission unit 26 detects whether the power transmission unit 26 is coupled to the host system 500a or an external power source 500b, and the power transmission unit 26 handshakes with the host system 500a according to the detection result.

In more specific terms, when the power transmission unit 26 detects that the power transmission unit 26 is coupled to the host system 500a, but not coupled to the external power source 500b, the power transmission unit 26 returns a handshake signal to inform the host system 500a to raise the voltage (for example, increasing from 5 V to 12 V), which is output to the data storage device 20. The above voltage is supplied to the data storage device 20, for example, via the Vbus pin of a USB interface. In this embodiment where the SATA HD 24 is 3.5-inch SATA HD, the power transmission unit 26 transmits the raised voltage to the SATA HD 24 as the working voltage of the SATA HD 24. Moreover, the power transmission unit 26 converts the voltage supplied by the host system 500a (for example, converting 12 V into 5 V) via a DC-DC converter DC5 and then transmits the converted voltage to the SATA Bridge 22 as an enable signal Sd to enable the SATA Bridge 22. Besides transmitting the enable signal Sd, the power transmission unit 26 further takes the converted voltage as the working voltage of the SATA Bridge 22.

When the power transmission unit 26 detects that the power transmission unit 26 is coupled to both the host system 500a and the external power source 500b, the power transmission unit 26 selects the voltage from the external power source 500b rather than the host system 500a to supply power to the data storage device 20. In one embodiment, the power transmission unit 26 returns a handshake signal to inform the host system 500a not to raise the voltage output to the data storage device 20. The power transmission unit 26 transmits the voltage from the external power source 500b to the SATA HD 24 as the working voltage of the SATA HD 24. The enable signal Sd could be from the host system 500a or from the external power source 500b. In one embodiment, the power transmission unit 26 may directly take the voltage supplied by the host system 500a as the enable signal Sd and the enable signal Sd is transmitted to the SATA Bridge 22. In another embodiment, the DC-DC converter DC5 converters the voltage supplied by the external power source 500b, takes the converted voltage as the enable signal Sd and then transmits the enable signal Sd to the SATA Bridge 22. Moreover, the power transmission unit 26 may take the converted voltage as the working voltage of the SATA Bridge 22.

In the aforementioned ways, the USB power of the host system 500a is not directly coupled to the STATA bridge 22. Therefore, when the host system 500a supplies the high voltage, the SATA Bridge 22 will not burn out or break down.

Universal Serial Bus Hub (USB Hub)

Figure 3:
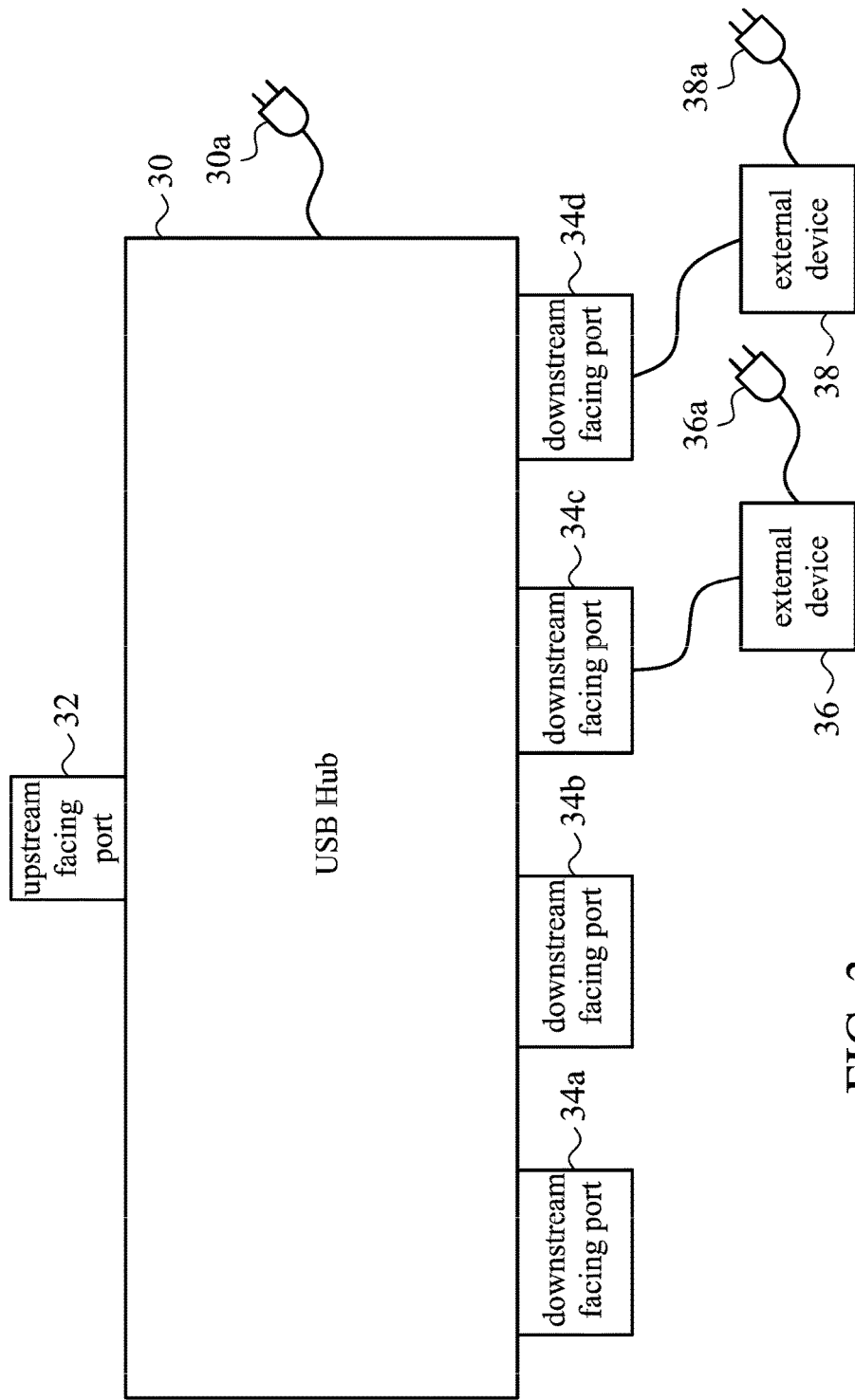
FIG. 3 is a diagram illustrating a conventional Universal Serial Bus Hub (USB Hub)
Figure 4B:
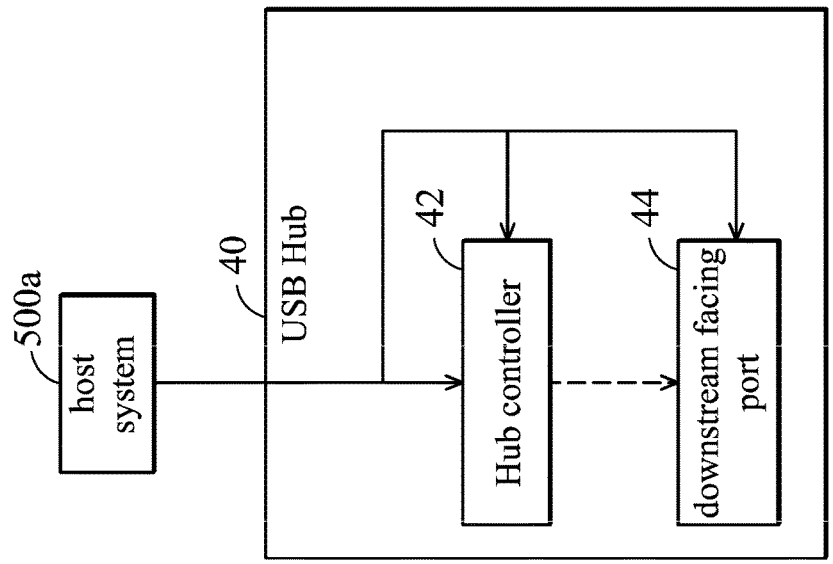
FIG. 4B is a diagram illustrating a conventional USB Hub which receives the enable signal with the voltage level of 5V, under Bus-Power mode.
Figure 4A:
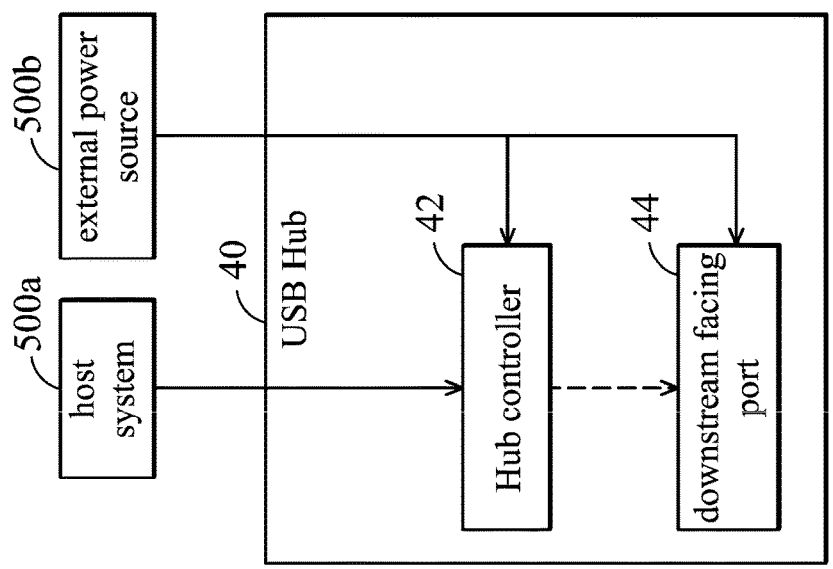
FIG. 4A is a diagram illustrating a conventional USB Hub which receives the enable signal with the voltage level of 5V, under Self-Power mode.
Figure 4C:
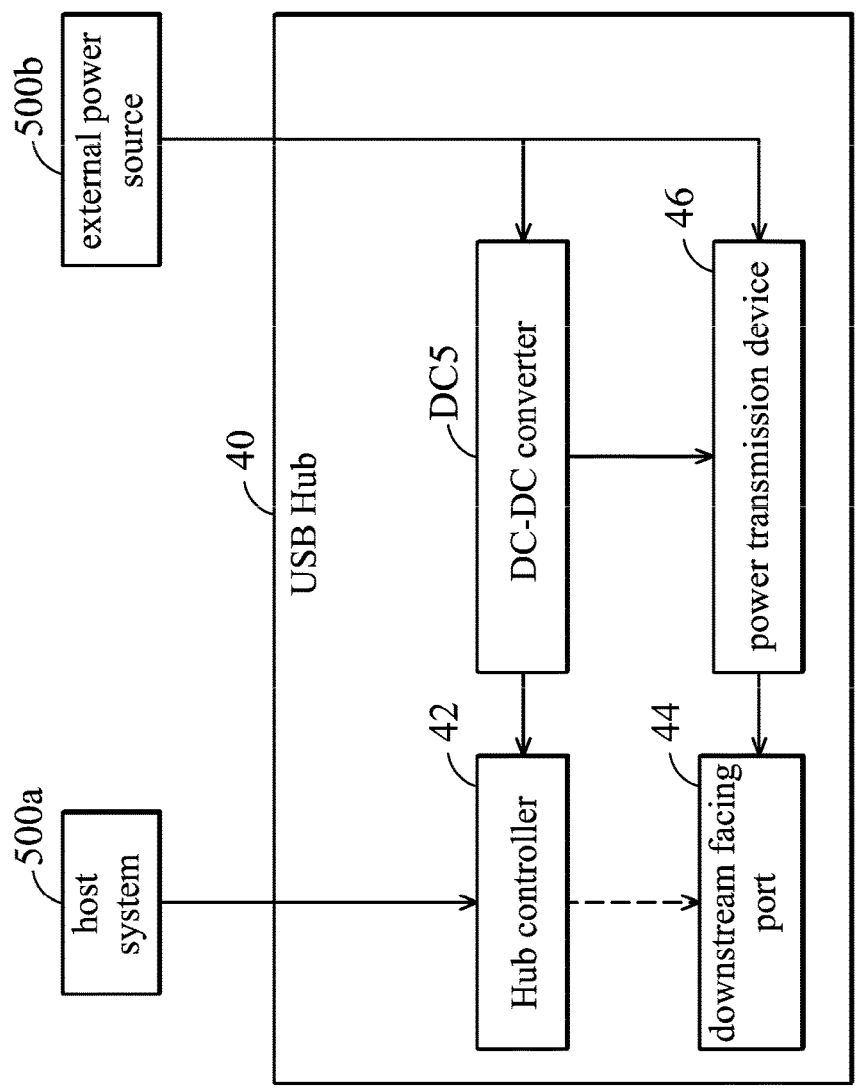
FIG. 4C is a conceptual diagram illustrating a conventional USB Hub which uses a new USB Power Delivery specification in Self-Power mode.
Figure 5:
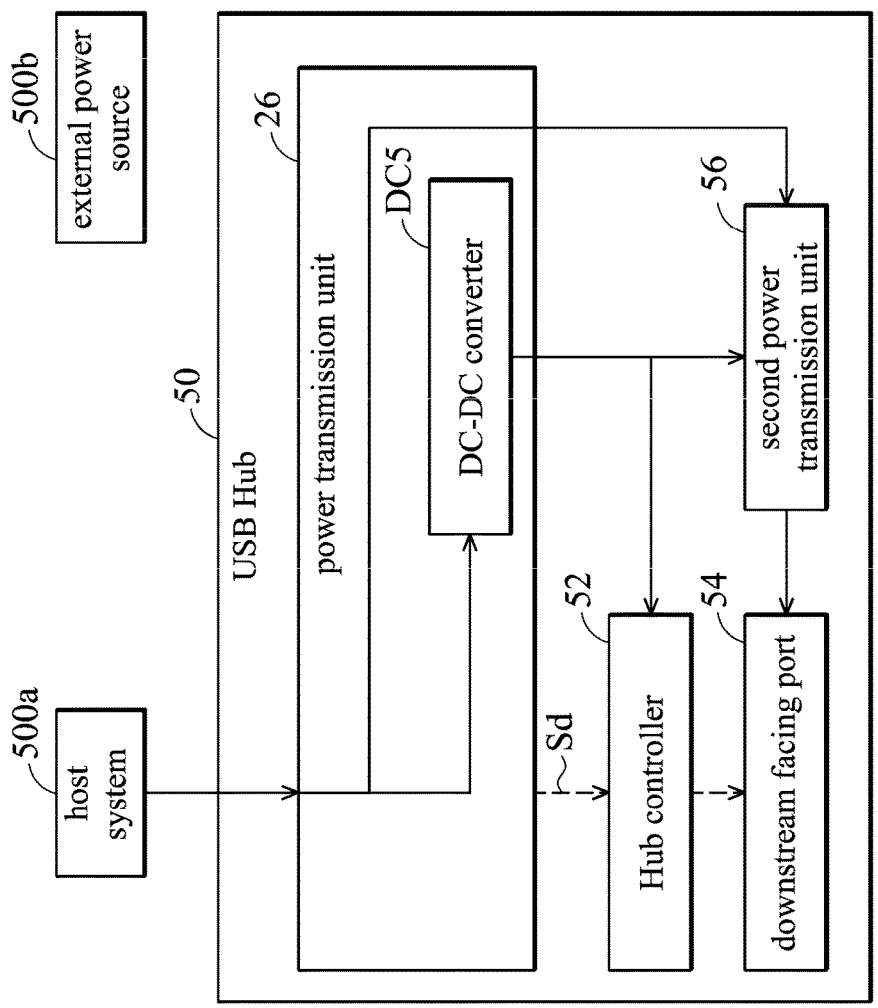
FIG. 5 is a diagram illustrating a Universal Serial Bus Hub (USB Hub) coupled to a host system 500a, according to an embodiment of the present invention.

FIG. 3 depicts the background of Universal Serial Bus. FIGS. 4A, 4B and 4C illustrate the limitations and the problems encountered by the conventional USB Hub. FIG. 5 presents the disclosure of the present invention and illustrates how the present invention overcomes the problems encountered by the conventional USB Hub.

FIG. 3 is a diagram illustrating a conventional Universal Serial Bus Hub (USB Hub). In order to provide a thorough understanding, the background of a Universal Serial Bus Hub is described in advance. The Universal Serial Bus Hub 30 has an upstream facing port 32 and a plurality of downstream facing ports 34a, 34b, 34c and 34d. The upstream facing port 32 is arranged to be connected to the host system (not shown) and the plurality of downstream facing ports 34c-34d are respectively arranged to be connected to the external device. The external device can be a mouse, keyboard, speaker, liquid-crystal display (LCD), or even the data storage device 20 of FIG. 2.

FIG. 4A is a diagram illustrating a conventional USB Hub under Self-Power mode; FIG. 4B is a diagram illustrating a conventional USB Hub under Bus-Power mode; FIG. 4C is a diagram illustrating a conventional USB Hub which has adopted a new USB Power Delivery specification. FIGS. 4A-4C respectively correspond to and are the same as FIGS. 1A-1C. Therefore, only the difference is described.

In FIG. 4A and FIG. 4B, a Universal Serial Bus Hub 40 is represented with the term "USB Hub 40" below, comprising: a Hub controller 42 and a downstream facing port 44 which respectively correspond to the SATA Bridge 12 and the SATA HD 14 of FIG. 1A. The downstream facing port 44 may correspond to the plurality of downstream facing ports 34a-34d and is used to be coupled to the external device.

As shown in FIGS. 4A and 4B, obviously, the USB power line is needed for the downstream facing port 44 of the conventional USB Hub 40 to supply electric power to the external device (not shown). The voltage level of the USB power line is 5V. Therefore, the downstream facing port 44 can only output the voltage with 5 V voltage level. That is to say, the downstream facing port 44 is unable to output the high voltage, such as 12 V or 20 V. In this situation, flexibility of the conventional USB Hub 40 will be limited.

The situation where the downstream facing port 44 outputs the high voltage will be discussed in detail below. It is worthy of note that the high voltage output by the downstream facing port 44 is supplied by the external power source 500b or by USB power of the host system 500a.

In FIG. 4C, the external power source 500b may supply voltage with high voltage level (such as 12 V), and the USB Hub 40 further comprises a power transmission device 46 outputs the 5 V or 12 V to the downstream facing port 44 depending on the requirement.

However, it is worthy of note that if the host system 500a and the USB Hub 40 are both support the new USB Power Delivery specification, the host system 500a may be able to supply a voltage with a voltage level higher than 5 V, such as 12 V or 20 V, to the USB Hub 40. At this time, the Hub controller 42 may burn out or break down because of receiving the high voltage. Therefore, there is a need to present a new Universal Serial Bus Hub which can work normally under the high voltage supplied by the USB power line and can output a voltage level of 5 V or other than 5 V.

FIG. 5 is a diagram illustrating a Universal Serial Bus Hub (USB Hub) coupled to a host system 500a, according to an embodiment of the present invention. The Universal Serial Bus Hub 50 is represented with term "USB Hub 50" below, comprising a Hub controller 52, at least a downstream facing port 54, a power transmission unit 26 and a second power transmission unit 56. The Hub controller 52 is able to process data transmission or power transmission between the host system 500a and the external device (not shown).

Being similar with the power transmission unit 26 of FIG. 2, the power transmission unit 26 of FIG. 5 is also able to detect the connection between the power transmission unit 26 and the host system 500a, and between the power transmission unit 26 and the external power source 500b. The behavior of the power transmission unit 26 of the USB Hub 50 is similar with the power transmission unit 26 of the data storage device 20 of FIG. 2, and it is not described again herein.

The second power transmission unit 56 handshakes with an external device (not shown), which is connected to the downstream facing port 54. In this way, the second power transmission unit 56 detects whether raising the voltage level of the downstream facing port 54, based on the response from the external device. In more specific terms, when the external device needs high voltage, such as 12 V or 20 V, the second power transmission unit 56 may direct the high voltage from the host system 500a or the external power source 500b to the downstream facing port 54. If the external device does not need high voltage, the second power transmission unit 56 outputs the voltage level of 5 V. The above descriptions are only used for exemplifying the invention, and it is not limited thereto. In the aforementioned method, the downstream facing port 54 is able to output the high voltage.

In the preferred embodiment of the present invention, an intermediate electronic device having two advantages is further presented. The first advantage is that when the host system raises the voltage of USB power, the intermediate electronic device can work normally and will not burn out or break down. The second advantage is that when the power of the host system is insufficient or the host system needs power, the intermediate electronic device can supply the voltage of the external power to the host system as the power source of the host system.

Figure 6:
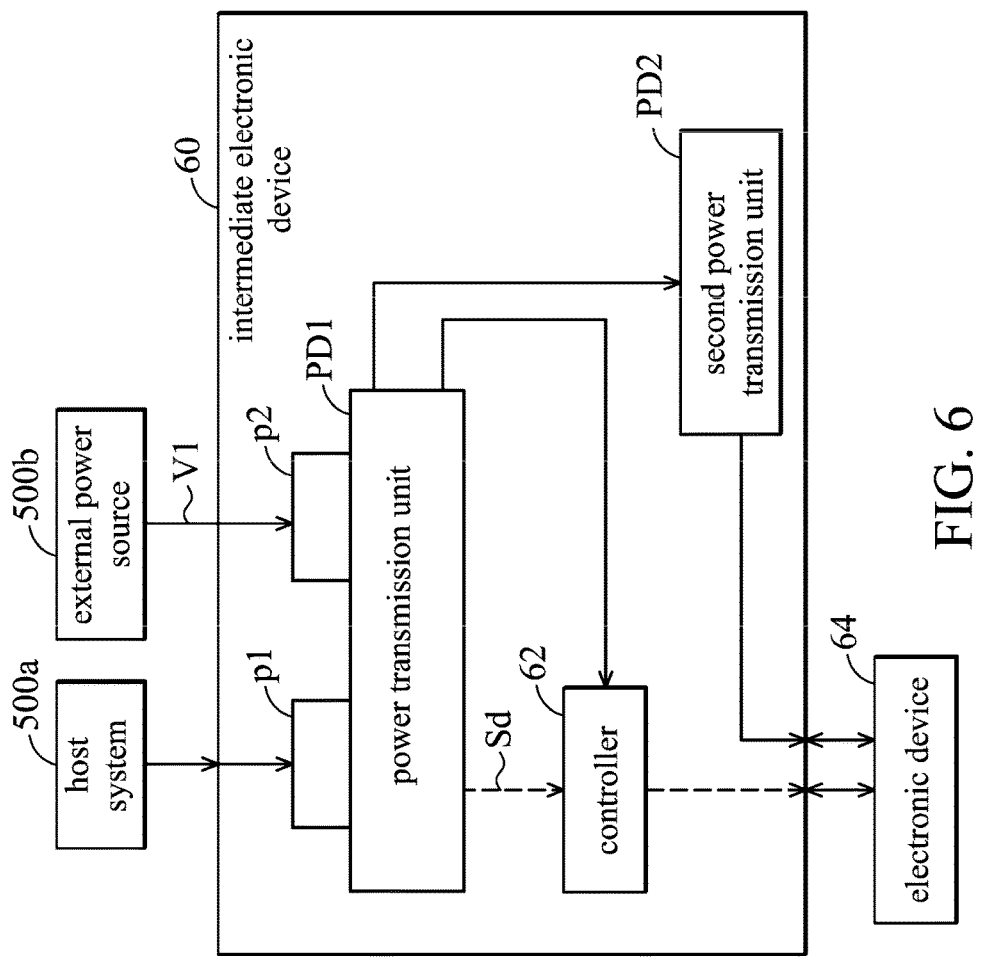
FIG. 6 is a diagram illustrating an intermediate electronic device coupled to a host system 500a and an external power source 500b, according to an embodiment of the present invention.

FIG. 6 is a diagram illustrating an intermediate electronic device, according to a preferred embodiment of the present invention. An intermediate electronic device 60 is arranged to be coupled to a host system 500a and an external power source 500b. The intermediate electronic device 60 comprises: a controller 62 and a power transmission unit PD1. The controller 62 may be enabled by an enable signal to process the data transmission between the host system 500a and the electronic device 64. The power transmission unit PD1 is disposed between the host system 500a and the electronic device 64 to detect whether the power transmission unit PD1 is coupled to the host system 500a or an external power source 500b.

When the power transmission unit PD1 detects that the power transmission unit PD1 is coupled to the host system 500a, but not coupled to the external power source 500b, the power transmission unit PD1 informs the host system 500a to raise the voltage output to the intermediate electronic device 60 to supply power to the electronic device 64, and outputs an enable signal Sd.

When the power transmission unit PD1 detects that the power transmission unit PD1 is coupled to both the host system 500a and the external power source 500b, the power transmission unit PD1 selects a first voltage V1 from the external power source 500b rather than the voltage from the host system 500a to supply power to the electronic device 64, and outputs the enable signal Sd. In an embodiment, the power transmission unit PD1 may convert the first voltage V1 into the appropriate voltage and then output it to the controller 62 as an enable signal Sd.

Moreover, in an embodiment, the power transmission unit PD1 further comprises a first power port p1 and a second power port p2, which are respectively coupled to the host system 500a and the external power source 500b. The intermediate electronic device 60 is coupled to the host system 500a, for example, via the USB bus, and the host system 500a may supply USB power via the Vbus pin of the USB bus.

Moreover, the intermediate electronic device 60 further comprises a second power transmission unit PD2, which is coupled to the power transmission unit PD1. The second power transmission unit PD2 may detect the working voltage (such as 5 V or 12 V) which the electronic device 64 needs. Then the second power transmission unit PD2 may convert the voltage supplied by the power transmission unit PD1 into the working voltage, and then output the converted voltage to the electronic device 64.

In this embodiment, the intermediate electronic device 60 can be 2.5-inch SATA external hard driver enclosure, 3.5-inch SATA external hard driver enclosure or the Universal Serial Bus Hub (USB Hub), but it is not limited thereto. When the intermediate electronic device 60 is the 2.5-inch SATA external hard driver enclosure or 3.5-inch SATA external hard driver enclosure, the controller 62 and the electronic device 64 can respectively be the SATA Bridge and SATA HD, but it is not limited thereto. Likewise, when the intermediate electronic device 60 is Universal Serial Bus Hub, the controller 62 and the electronic device 64 can respectively be the Hub controller and the external electronic device coupled via the downstream facing port, but it is not limited thereto.

Figure 7:
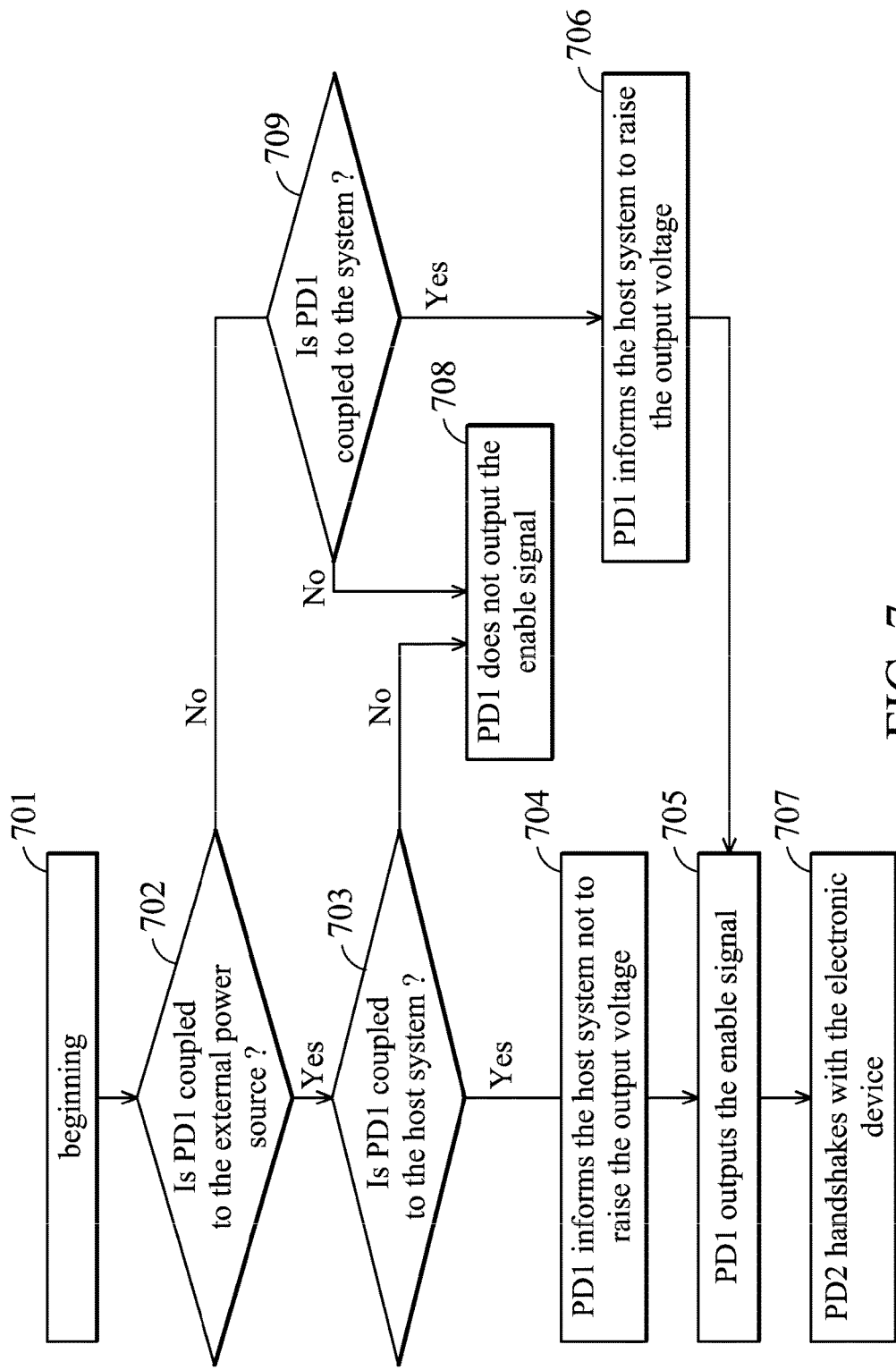
FIG. 7 is a block flow chart illustrating the operation of the intermediate electronic device of FIG. 6.

FIG. 7 is a block flow chart illustrating the operation of the intermediate electronic device of FIG. 6. The flow chart shown in FIG. 7 illustrates a first feature function. At the same time, as illustrated in FIG. 6, firstly, it is beginning at block 701. Then, at block 702, a power transmission unit PD1 detects whether the power transmission unit PD1 of the intermediate electronic device 60 is coupled to the external power source 500*b*. If "no", the method proceeds to block 709. If "yes", the method proceeds to block 703.

At block 703, the power transmission unit PD1 detects whether the power transmission unit PD1 is coupled to the host system 500*a* or not. If "no", the method proceeds to block 708. If "yes", the method proceeds to block 704.

At block 708, the power transmission unit PD1 detects that the power transmission unit PD1 is not coupled to the host system 500*a*, so the power transmission unit PD1 does not output the enable signal Sd.

At block 704, the power transmission unit PD1 detects that the power transmission unit PD1 is coupled to both the host system 500*a* and the external power source 500*b*. The power transmission unit PD1 selects a first voltage V1 from the external power source 500*b* rather than the output voltage from the host system 500*a* to supply power to the electronic device 60. When the host system 500*a* issues a handshake signal to the power transmission unit PD1, the power transmission unit PD1 responses the handshake signal to inform the host system 500*a* not to raise the voltage output to the intermediate electronic device 60. At block 705, the power transmission unit PD1 outputs the enable signal Sd to enable the controller 62. The controller 62 processes data transmission between the host system 500*a* and the electronic device 64. Finally, the method proceeds to block 707.

At block 709, the power transmission unit PD1 detects whether the power transmission unit PD1 is coupled to the host system 500*a* or not. If "no", the method proceeds to block 708. If "yes", the method proceeds to block 706.

At block 706, the power transmission unit PD1 detects that the power transmission unit PD1 is coupled to the host system 500*a* ("yes" at block 709), but not coupled to the external power source 500*b* ("no" at block 702), the host system 500*a* issues a handshake signal to the power transmission unit PD1. The power transmission unit PD1 responses the handshake signal, based on the detection results, to inform the host system 500*a* to raise the voltage output to the intermediate electronic device 60 to supply power to the electronic device 64. Likewise, the method then proceeds to block 705. Finally, the method proceeds to block 707.

It is worthy of note that the voltage supplied by the external power source 500*b* is more stable than the host system 500*a*, for example, the voltage ripple is smaller, and therefore when the power transmission unit PD1 detects that the power transmission unit PD1 is coupled to both the host system 500*a* and the external power source 500*b*, the power transmission unit PD1 selects the external power source 500*b* to supply power to the electronic device 64.

At block 707, the second power transmission unit PD2 handshakes with the electronic device 64 to convert the voltage output by the power transmission unit PD1 into the voltage which the electronic device 64 needs.

Figure 8:
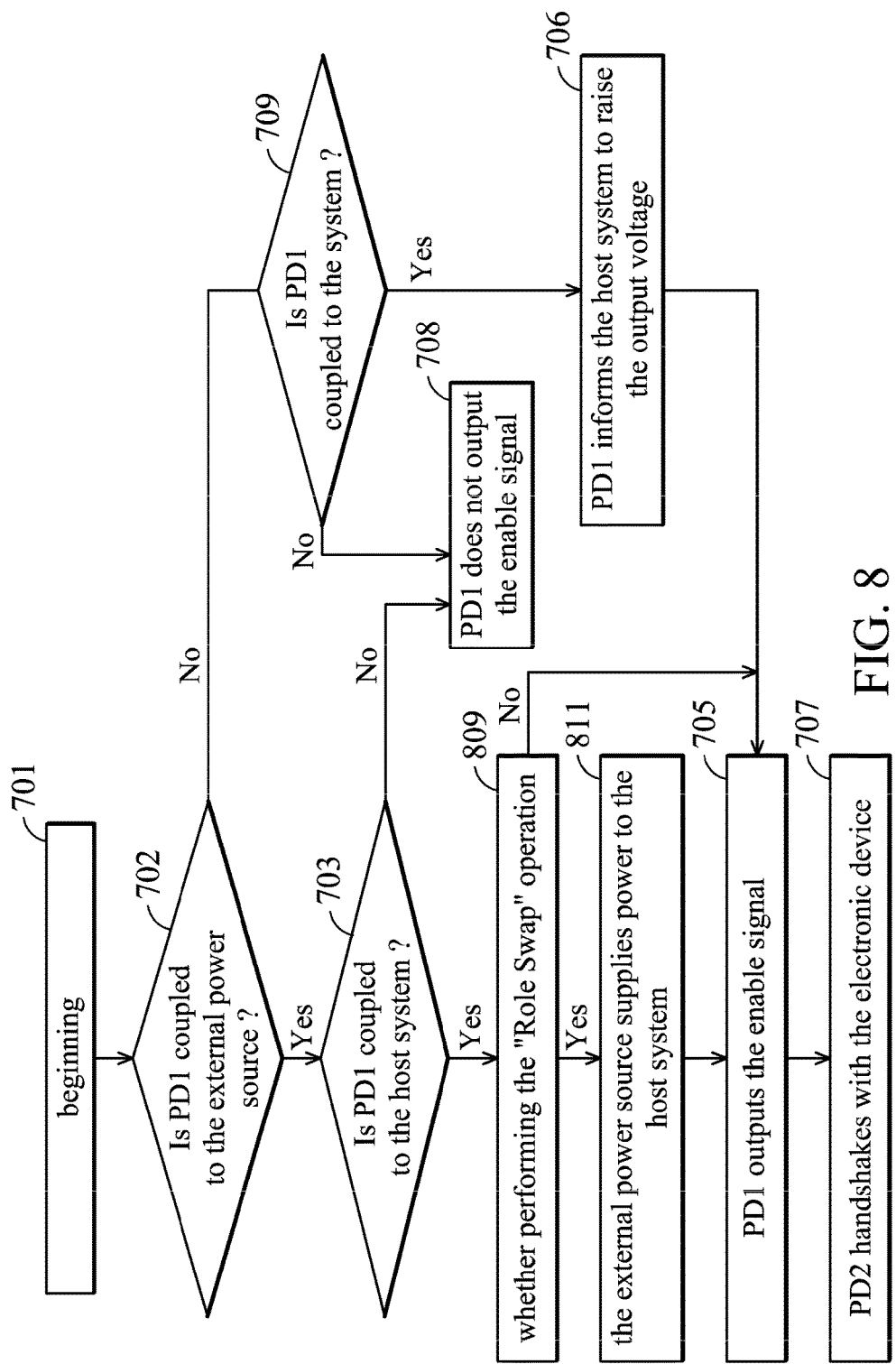
FIG. 8 is a block flow chart illustrating the operation of the intermediate electronic device of FIG. 6.

FIG. 8 is a block flow chart illustrating the operation of the intermediate electronic device of FIG. 6. The flow chart shown in FIG. 7 illustrates a second feature function. The block whose number in FIG. 8 is the same as in FIG. 7 will not be described again herein.

Compared with FIG. 7, obviously, the difference between FIG. 8 and FIG. 7 is block 809 and block 811. It is worthy of note that, under the new USB Power Delivery specification, when the host system 500*a* is supplied with power by the battery, and the power of the battery is insufficient, the host system 500*a* may ask the electronic device (for example, the intermediate electronic device 60 in FIG. 6), which is coupled to the host system 500*a*, whether the electronic device can supply power or not. The procedure of asking is called "Role Swap". Block 809 represents the "Role Swap" operation, and it is described below. The power transmission unit PD1 detects that the power transmission unit PD1 is coupled to both the host system 500*a* and the external power source 500*b*, and then the power transmission unit PD1 determines whether the host system 500*a* requires the electric power from the external power source 500*b* as the power source for the host system 500*a*. If "no", the method proceeds to block 705. If "yes", the method proceeds to block 811. At block 811, the power transmission unit PD1 may act as the upstream facing port to provide power the host system 500*a*, such that the first voltage V1 of the external power source 500*b* is supplied to the host system 500*a* as the power source for the host system 500*a*.

Figure 9:
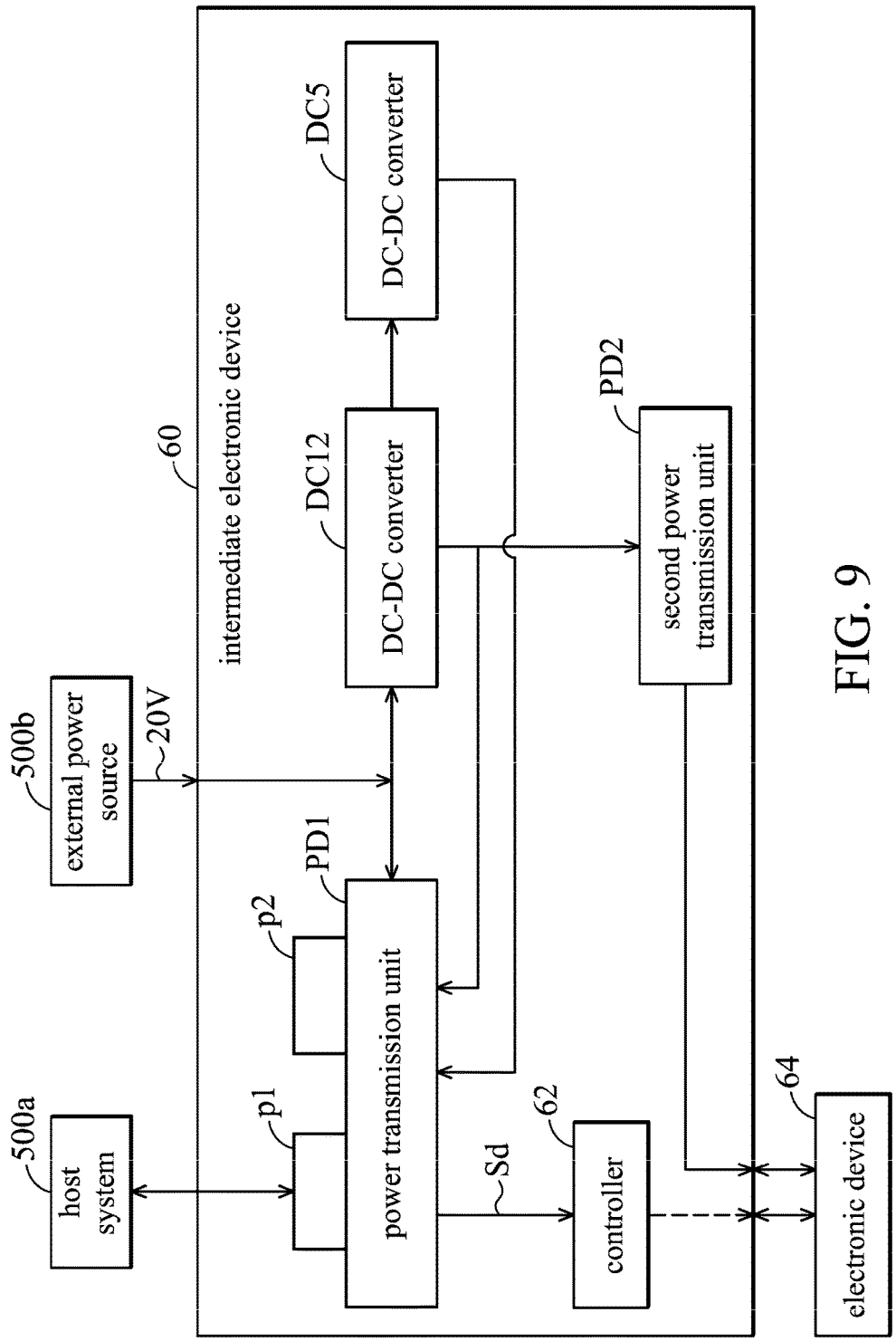
FIG. 9 is a diagram illustrating the intermediate electronic device of FIG. 6 acting as a Universal Serial Bus Hub (USB Hub)

FIG. 9 is another embodiment of the present invention, and it shows that the intermediate electronic device of FIG. 6 is a Universal Serial Bus Hub (USB Hub). Compared with FIG. 6, a USB Hub 60 of FIG. 9 further comprises a DC-DC converter 5 and a DC-DC converter 12. In this embodiment, the external power source 500*b* can supply the voltage level of 20 V. FIG. 9 clearly illustrates the behavior of the internal device of the USB Hub 60 when the USB Hub 60 performs the Role Swap operation.

When the power transmission unit PD1 detects that the host system 500*a* needs the voltage from the external power source 500*b* as the power source for the host system 500*a*, the power transmission unit PD1 may directly supply the voltage 20 V from the external power source 500*b* to the host system 500*a* as the power source for the host system 500*a*. Moreover, the power transmission unit PD1 may further supply 5V (the DC-DC converter 5 converts 20 V into 5 V) or 12 V (the DC-DC converter 12 converts 20 V into 12 V) to the host system 500*a*. The aforementioned voltage value is only used for exemplifying the present invention, and it is not used to limit the Universal Serial Bus Hub of the present invention.

Figure 10:
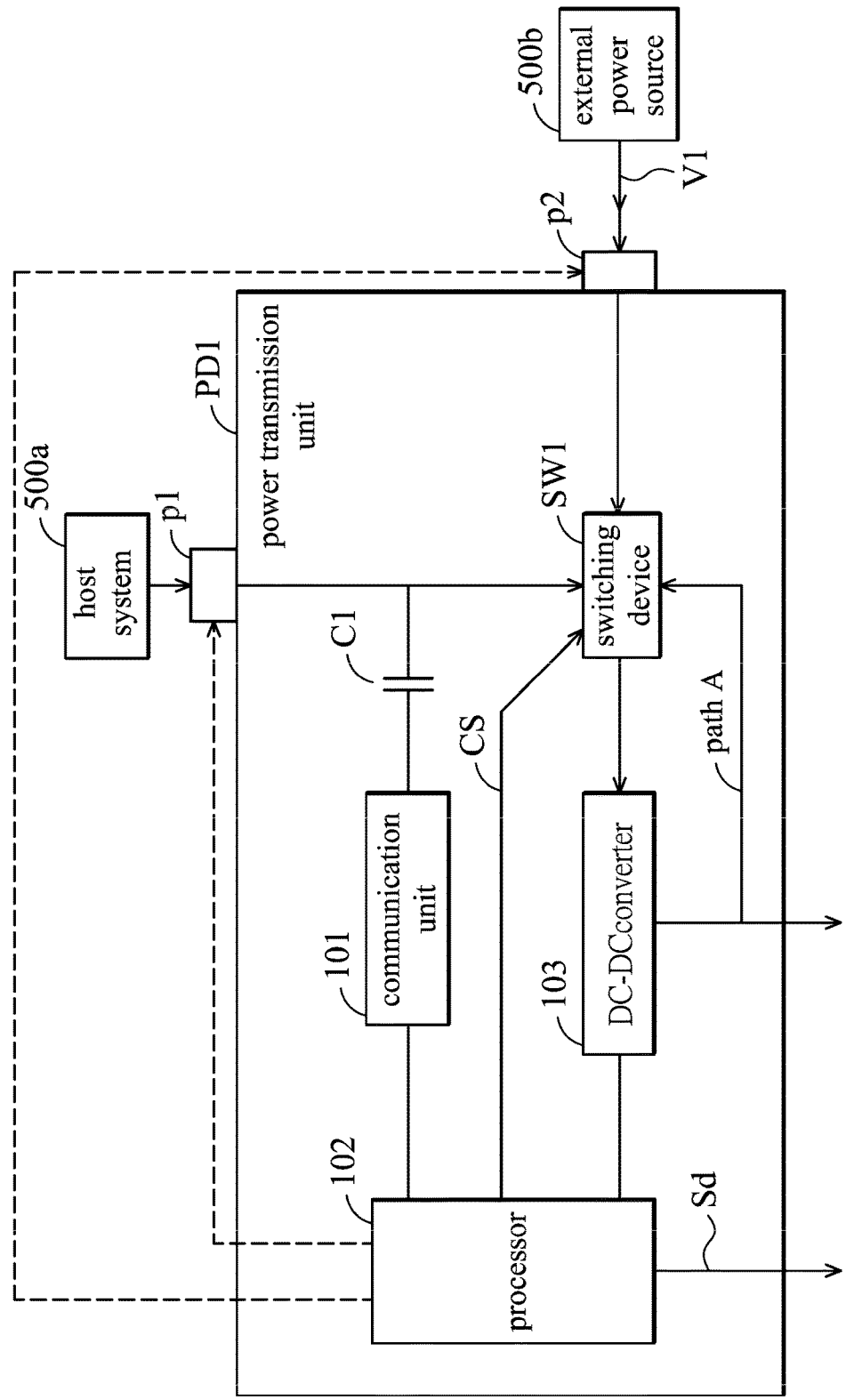
FIG. 10 is a diagram illustrating the internal circuit structure of the power transmission unit PD1 of FIG. 6, according to an embodiment of the present invention.

FIG. 10 is a diagram illustrating the internal circuit structure of the power transmission unit PD1, according to an embodiment of the present invention. The power transmission unit PD1 comprises a switching device SW1, a communication unit 101, a processor 102, a DC-DC converter 103 and a capacitor C1. The DC-DC converter 103 is arranged to convert the received voltage. The descriptions below describe the behavior of each circuit inside the power transmission unit PD1 while performing the Role Swap operation.

The processor 102 detects whether the first power port p1 and the second power port p2 are respectively coupled to the host system 500*a* and the external power source 500*b*. The communication unit 101 responds to a handshake signal issued by the host system 500a, according to the detection results.

In more specific terms, when the processor 102 detects the first power port p1 and the second power port p2 are respectively coupled to the host system 500a and the external power source 500b, the processor 102 outputs a control signal CS to control the switching device SW1 to output a first voltage V1 from the external power source 500b to the DC-DC converter 103. The DC-DC converter 103 may supply the converted voltage to the controller 62 and the electronic device 64. The communication unit 101 responds to the handshake signal, according to the detection results, so as to inform the host system 500a not to raise the voltage output to the first power port p1. In an embodiment, the processor 102 outputs the enable signal Sd.

Alternatively, when the processor 102 detects that only the first power port p1 is coupled to the host system 500a, and the second power port p2 is not coupled to the external power source 500b, the processor 102 outputs the control signal CS to control the switching device SW1 to output the voltage from the host system 500a. The communication unit 101 responds to the handshake signal, according to the detection results, so as to inform the host system 500a to raise the voltage output to the first power port p1. In an embodiment, the processor 102 outputs the enable signal Sd. It is worthy of note that the enable signal Sd is not limited to being issued by the processor 102. The enable signal Sd can also be supplied by the output of the DC-DC converter 103. The above description is only used for exemplifying the present invention, and it is not used to limit the present invention.

Moreover, when the processor 102 detects that the power transmission unit PD1 is coupled to both the host system 500a and the external power source 500b and when the processor 102 detects that the host system 500a needs power according to the handshake signal, the processor 102 issues the control signal CS to control the switching device SW1, such that the first voltage V1 of the external power source 500b is supplied to the host system 500a as the power source for the host system 500a. Alternatively, the power transmission unit PD1 may also supply the voltage converted by the DC-DC converter 103 to the host system 500a via the switching device SW1 and through the path A. The converted voltage acts as the power source for the host system 500a.

Figure 11:
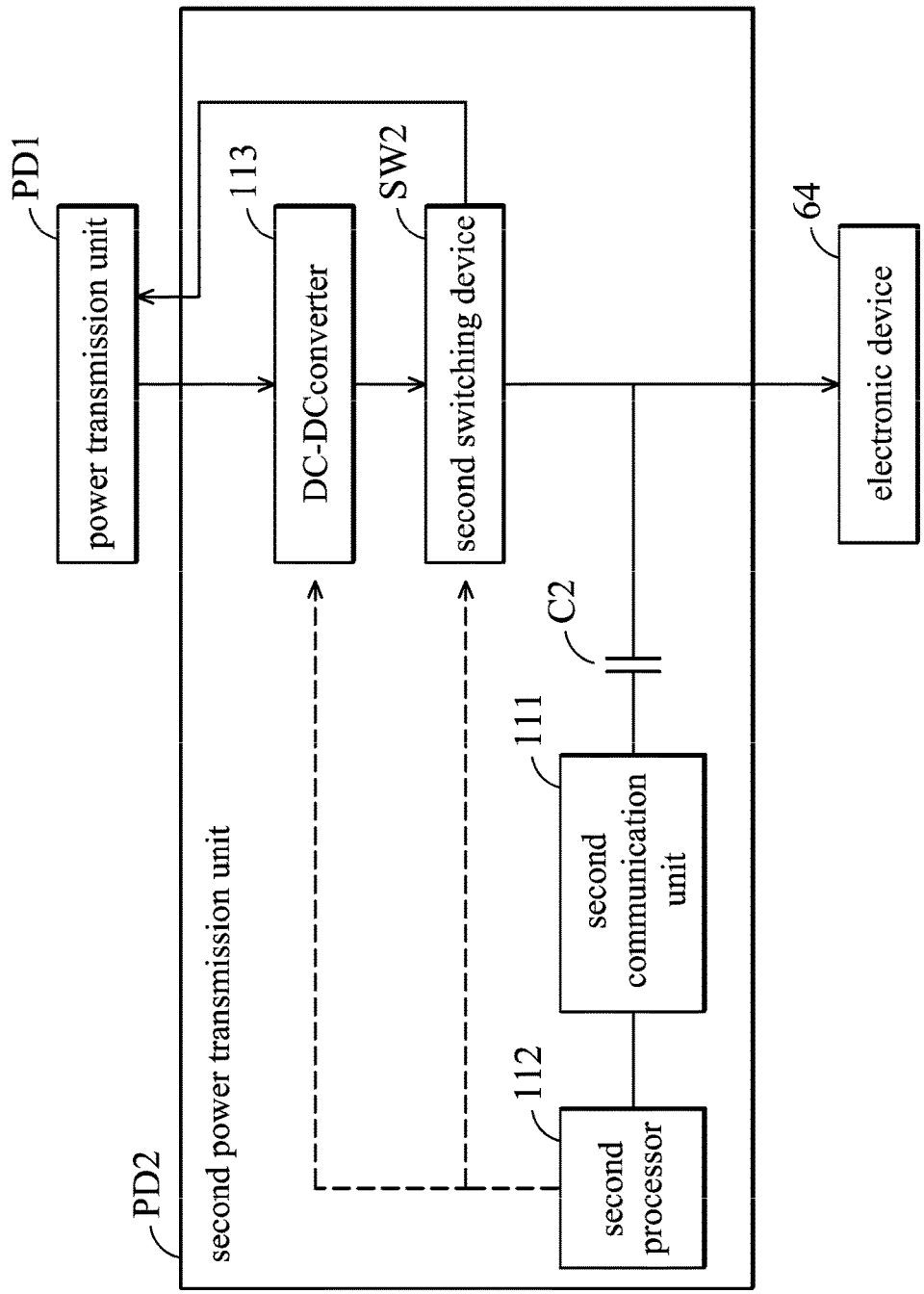
FIG. 11 is a diagram illustrating the internal circuit structure of the second power transmission unit of FIG. 6 and illustrating the connection between the components in the intermediate electronic device, according to an embodiment of the present invention.

FIG. 11 is a diagram illustrating the internal circuit structure of the second power transmission unit and illustrating the connection between the components inside the intermediate electronic device, according to an embodiment of the present invention. The second power transmission unit PD2 comprises: a second communication unit 111, a second processor 112, a DC-DC converter 113, a second switching device SW2 and a capacitor C2.

Referring to FIG. 6 and FIG. 11, the second power transmission unit PD2 handshakes with the electronic device 64 to obtain the voltage which the electronic device 64 needs. The second processor 112 controls the DC-DC converter 113, according to the result of the handshake, such that the DC-DC converter 113 outputs the voltage which the electronic device 64 needs.

In an embodiment of the present invention, the intermediate electronic device 60 is not connected to the external power source 500b, and the electronic device 64 is an external device having a power transmission unit (not shown). The electronic device 64 is connected to the external power source 500b. The second power transmission unit PD2 handshakes with the power transmission unit of the electronic device 64. When the intermediate electronic device 60 is unable to provide sufficient power (for example, the intermediate electronic device 60 is not connected to the external power source 500b or the host system 500a is unable to supply sufficient power), the intermediate electronic device 60 informs (for example, via the handshake signal) the power transmission unit of the electronic device 64 via the second communication unit 111 that the intermediate electronic device 60 needs power. At this time, the electronic device 64 supplies the first voltage V1 of the external power source 500b to the second power transmission unit PD2. In an embodiment, the second processor 112 controls the second switching device SW2 to supply the first voltage V1 of the external power source 500b to the intermediate electronic device 60.

Figure 12:
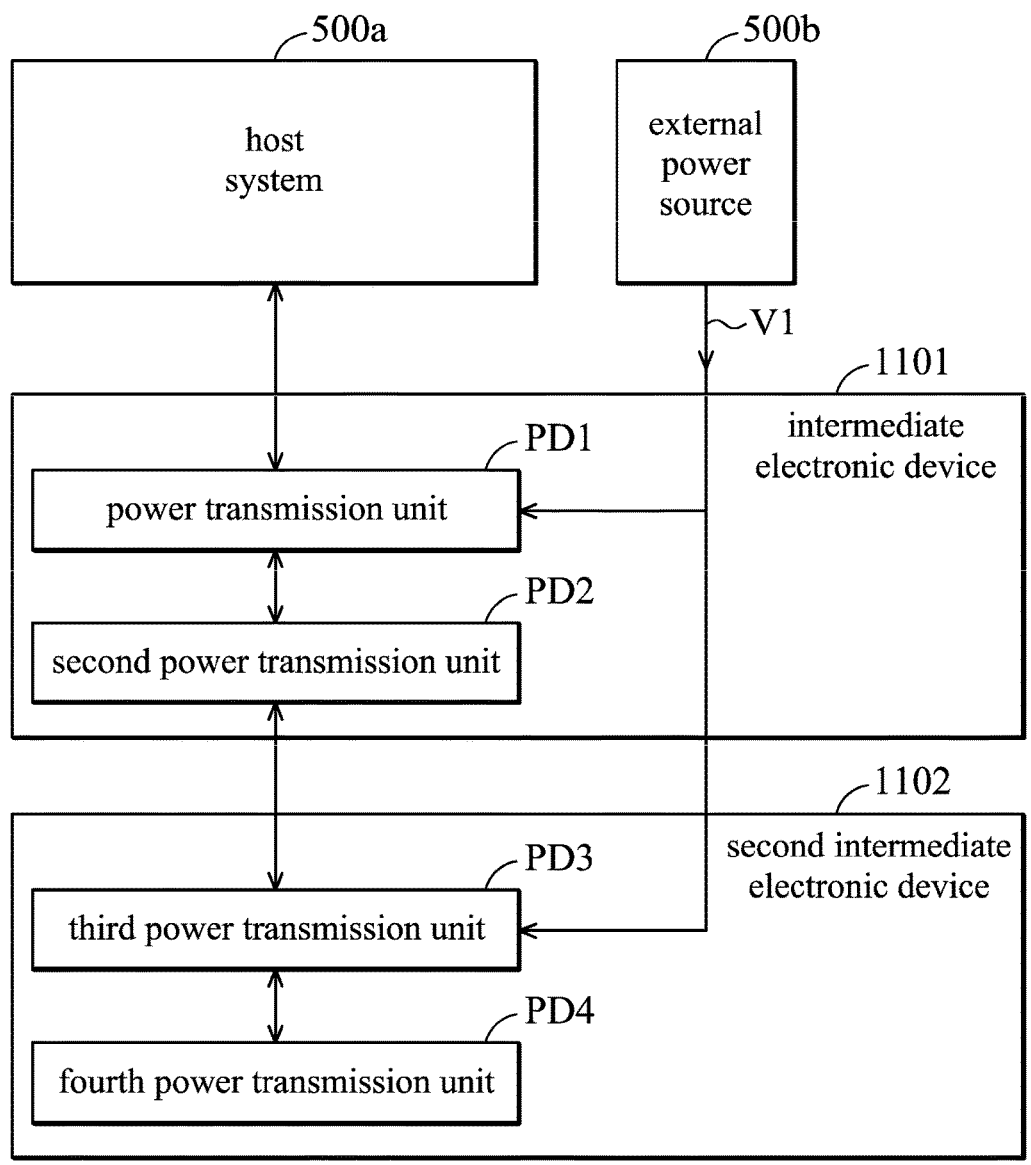
FIG. 12 is a diagram illustrating an electronic system coupled to the external power source 500b, according to an embodiment of the present invention.

FIG. 12 is a diagram illustrating an electronic system coupled to the external power source 500b, according to an embodiment of the present invention. An electronic system 1100 comprises: a host system 500a, an intermediate electronic device 1101 and the second intermediate electronic device 1102. The intermediate electronic device 1101 and the second intermediate electronic device 1102 are the same as the intermediate electronic device 60 of FIG. 6. The intermediate electronic device 1101 comprises: a controller (not shown), the power transmission unit PD1 and the second power transmission unit PD2. The intermediate electronic device 1101 is the same as the intermediate electronic device 60 of FIG. 6, so in order to simplify the figures only the power transmission unit PD1 and the second power transmission unit PD2 are shown in FIG. 12. Likewise, FIG. 12 only shows the third power transmission unit PD3 and the fourth power transmission unit PD4 of the second intermediate electronic device 1102. The interaction between the intermediate electronic device 1101 and the second intermediate electronic device 1102 will be described in detail below.

With respect to the plurality of the power transmission units of the intermediate electronic device 1101, when the power transmission unit PD1 detects that the first power port p1 and the second power port p2 are respectively coupled to the host system 500a and the external power source 500b, the power transmission unit PD1 selects a first voltage V1 from the external power source 500b to supply power to the second intermediate electronic device 1102, and outputs the enable signal Sd to enable the controller of the intermediate electronic device 1101.

With respect to the plurality of the power transmission units of the second intermediate electronic device 1102, when the third power transmission unit PD3 detects its third power port p3 (not shown) and fourth power port p4 (not shown) are respectively coupled to the intermediate electronic device 1101 and the external power source 500b, the third power transmission unit PD3 selects the first voltage V1 supplied by the external power source 500b to supply power to the downstream electronic device (not shown), which is coupled to the second intermediate electronic device 1102, and outputs a second enable signal Sd2 to enable the controller of the second intermediate electronic device 1102. Alternatively, when the third power transmission unit PD3 detects that the third power port p3 is coupled to the intermediate electronic device 1101 and the fourth power port p4 is not coupled to the external power source 500b, the third power transmission unit PD3 informs the second power transmission unit PD2, such that the intermediate electronic device 1101 raises the voltage output to the third power port p3 to supply power to the downstream electronic device (not shown), which is coupled to the second intermediate electronic device 1102, and outputs the second enable signal Sd2 to enable the controller (not shown) of second intermediate electronic device 1102.

FIG. 3 shows the electronic system adopting conventional power transmission regulations. The upstream port 32 can only receive a voltage level of 5 V. Therefore, the Universal Serial Bus Hub 30 needs an additional power line 30a for receiving power from the external power source 500b. Likewise, the external devices 36 and 38, which are coupled to the plurality of downstream ports 34c and 34d, also need the additional power lines 36a and 38b to receive the voltage supplied by the external power source 500b as the power source for the external devices 36 and 38. In this method, there are too many power lines required by the whole electronic system. Therefore, in another embodiment of the present invention, both the intermediate electronic device 1101 and the second intermediate electronic device 1102 are not coupled to the external power source 500b, and the working voltage which the intermediate electronic device 1101 and the second intermediate electronic device 1102 need are supplied by the host system 500a.

Another embodiment of the present invention further discloses a method for operating an intermediate electronic device arranged to be coupled to a host system and an electronic device. Referring to FIG. 6, the method for operating an intermediate electronic device comprises: detecting the connection status between the intermediate electronic device 60 and the host system 500a, and between the intermediate electronic device 60 and an external power source 500b.

When the intermediate electronic device 60 is coupled to both the host system 500a and the external power source 500b, a first voltage V1 supplied by the external power 500b is received to supply power to the electronic device 64, and the enable signal Sd is sequentially output to the controller 62. Alternatively, when the intermediate electronic device 60 is coupled to the host system 500a, but not coupled to the external power source 500b, the host system is informed to raise the voltage output to the intermediate electronic device 60 to supply power to the electronic device 64 and the enable signal Sd is output.

Based on the above descriptions, in the preferred embodiment of the present invention, the intermediate electronic device is designed to be able to receive the high voltage of USB power without burning out or breaking down. Even the aforementioned intermediate electronic device can change the scheme of electric power supply on the conventional electronic system, such that the external power can also be supplied to the host system via the aforementioned intermediate electronic device.

Reference in the specification to "an embodiment," "one embodiment, "some embodiments," or "other embodiments" means that a particular feature, structure, or characteristic described in connection with the embodiments is included in at least some embodiments, but not necessarily all embodiments. Those who are skilled in this technology will understand that all of the disclosed aspects in the invention can be applied independently or be incorporated.

The invention has been described by way of example and in terms of preferred embodiment. However, this is not intended to limit the present invention to particular modes of practice, and it is to be appreciated that all changes, equivalents, and substitutes that do not depart from the spirit and technical scope of the invention are encompassed in the present invention. Those who are skilled in this technology can still make various alterations and modifications without departing from the scope and spirit of this invention. Therefore, the scope of the present invention shall be defined and protected by the following claims and their equivalents. In addition, the present disclosure may repeat reference numerals and/or letters in the various examples. This repetition is for the purpose of simplicity and clarity and does not in itself dictate a relationship between the various embodiments and/or configurations discussed.

What is claimed is:

1. An intermediate electronic device, arranged to be coupled to a host system and an electronic device, the intermediate electronic device comprising:
   a controller, enabled by an enable signal to process a data transmission between the host system and the electronic device; and
   a power transmission unit, disposed between the host system and the electronic device to detect whether the power transmission unit is coupled to the host system or an external power source;
   wherein, when the power transmission unit detects that the power transmission unit is coupled to the host system, but not coupled to the external power source, the power transmission unit informs the host system to raise the voltage which is outputted to the intermediate electronic device to supply power to the electronic device, and the power transmission unit converts the raised voltage into an appropriate voltage and outputs the appropriate voltage to the controller as the enable signal.

2. The intermediate electronic device as claimed in claim 1, wherein, when the power transmission unit detects that the power transmission unit is coupled to both the host system and the external power source, the power transmission unit selects a first voltage from the external power source to supply power to the electronic device, and the power transmission unit takes a second voltage supplied by the host system as the enable signal.

3. The intermediate electronic device as claimed in claim 1, wherein, when the power transmission unit detects that the power transmission unit is coupled to both the host system and the external power source, and when the host system informs the power transmission unit that the host system needs power, the power transmission unit supplies a first voltage from the external power source to the host system as the power source for the host system.

4. The intermediate electronic device as claimed in claim 1, wherein the power transmission unit further comprises:
   a first power port, arranged to be coupled to the host system;
   a second power port, arranged to be coupled to the external power source;
   a switching device;
   a processor;
   when the processor detects that the first power port and the second power port are respectively coupled to the host system and the external power source, the processor controls the switching device to output a first voltage from the external power source; and
   a communication unit;
   when the processor detects that the first power port is coupled to the host system, but the second power port is not coupled to the external power source, the communication unit informs the host system to raise the voltage output to the first power port; and
   a DC-DC converter, converting the voltage output by the switching device to the voltage which the electronic device needs.

5. The intermediate electronic device as claimed in claim 1, further comprising:
a second power transmission unit, coupled between the power transmission unit and the electronic device for converting the voltage output by the power transmission unit to the voltage which the electronic device needs.

6. The intermediate electronic device as claimed in claim 5, wherein the second power transmission unit further comprises:
a second communication unit, arranged to communicate with the electronic device to obtain the voltage which the electronic device needs;
a DC-DC converter, converting the voltage output by the power transmission unit to the voltage which the electronic device needs; and
a second processor, controlling the DC-DC converter according to the result of communication between the second communication unit and the electronic device, such that the DC-DC converter outputs the voltage which the electronic device needs.

7. The intermediate electronic device as claimed in claim 6, wherein the second power transmission unit further comprises:
a second switching device, when the electronic device is coupled to the external power source, and when the intermediate electronic device informs the electronic device via the second communication unit that the intermediate electronic device needs power, the second processor controls the second switching device to supply a first voltage of the external power source to the intermediate electronic device as the power source for the intermediate electronic device.

8. A method for operating an intermediate electronic device, wherein the intermediate electronic device is arranged to be coupled to a host system and an electronic device, comprising:
detecting the connection status between the intermediate electronic device and the host system, and between the intermediate electronic device and an external power source;
informing the host system to raise the voltage which is outputted to the intermediate electronic device to supply power to the electronic device when the intermediate electronic device is coupled to the host system, but not coupled to the external power source;
converting the raised voltage into an appropriate voltage; and
outputting the appropriate voltage to the controller as an enable signal to enable a controller of the intermediate electronic device.

9. The method for operating an intermediate electronic device as claimed in claim 8, further comprising:
when the intermediate electronic device is coupled to both the host system and the external power source, a first voltage supplied by the external power source is received to supply power to the electronic device, and a second voltage supplied by the host system is taken as the enable signal.

10. The method for operating an intermediate electronic device as claimed in claim 8, further comprising:
receiving a first voltage from the external power source to supply the host system as the power source for the host system when the intermediate electronic device is coupled to both the host system and the external power source.

11. The method for operating an intermediate electronic device as claimed in claim 8, wherein the intermediate electronic device comprises a power transmission unit and a second power transmission unit; the power transmission unit is arranged to detect whether the power transmission unit is coupled to the host system or the external power source, and receives the raised voltage from the host system; the second power transmission unit is arranged to convert the voltage output by the power transmission unit to the voltage which the electronic device needs.

12. An electronic system, comprising:
a host system; and
an intermediate electronic device, arranged to couple the host system to an electronic device, wherein the intermediate electronic device further comprises:
a controller, enabled by an enable signal to process the data transmission between the host system and the electronic device; and
a power transmission unit, disposed between the host system and the electronic device to detect whether the power transmission unit is coupled to the host system or an external power source;
wherein, when the power transmission unit detects that the power transmission unit is coupled to the host system, but not coupled to the external power source, the power transmission unit informs the host system to raise the voltage which is outputted to the intermediate electronic device to supply power to the electronic device, and the power transmission unit converts the raised voltage into an first appropriate voltage and outputs the first appropriate voltage to the controller as the enable signal.

13. The electronic system as claimed in claim 12, wherein when the power transmission unit detects that the power transmission unit is coupled to both the host system and the external power source, the power transmission unit selects a first voltage from the external power source to supply power to the electronic device, and the power transmission unit takes a second voltage supplied by the host system as the enable signal.

14. The electronic system as claimed in claim 12, wherein, when the power transmission unit detects that the power transmission unit is coupled to both the host system and the external power source, and when the host system informs the power transmission unit that the host system needs power, the power transmission unit supplies a first voltage from the external power source to the host system as the power source for the host system.

15. The electronic system as claimed in claim 12, wherein the electronic device is a second intermediate electronic device, arranged to couple the intermediate electronic device to a second electronic device, wherein the second intermediate electronic device comprises:
a second controller, enabled by a second enable signal to process the data transmission between the intermediate electronic device and the second electronic device; and
a third power transmission unit, detecting whether the third power transmission unit is coupled to the intermediate electronic device or the external power source;
wherein, when the third power transmission unit detects that the third power transmission unit is coupled to the intermediate electronic device, but not coupled to the external power source, the third power transmission unit informs a second power transmission unit to raise the voltage which is outputted from the intermediate electronic device to the second intermediate electronic device to supply power to the second electronic device, and the third power transmission unit converts the raised voltage into an second appropriate voltage and outputs the second appropriate voltage to the second controller as the second enable signal.

16. The electronic system as claimed in claim 15, wherein, when the third power transmission unit detects that the third power transmission unit is coupled to both the intermediate electronic device and the external power source, the third power transmission unit selects a first voltage from the external power source to supply power to the second electronic device, and the power transmission unit takes a second voltage supplied by the host system as the second enable signal.

* * * * *